United States Patent [19]

Ronyak et al.

[11] Patent Number: 5,546,880
[45] Date of Patent: Aug. 20, 1996

[54] ANNULAR FILAMENTARY STRUCTURES AND METHODS OF MAKING

[75] Inventors: David M Ronyak, Copley; Kevin L. Leffel, Akron, both of Ohio

[73] Assignee: The BF Goodrich Company, Akron, Ohio

[21] Appl. No.: 366,070

[22] Filed: Dec. 29, 1994

[51] Int. Cl.$^6$ .............................. D05B 3/00; B32B 31/10; B32B 32/12; F16D 69/02
[52] U.S. Cl. ...................... 112/475.01; 428/102; 428/113; 428/66.2; 188/250 C; 28/107; 112/420
[58] Field of Search .......................... 112/475.01, 475.08, 112/402, 420; 188/250 B, 250 R, 251 A, 250 C; 28/107, 158, 143; 428/65, 64, 102, 104, 113

[56] References Cited

U.S. PATENT DOCUMENTS

| | | | |
|---|---|---|---|
| 1,610,173 | 12/1926 | Slade . | |
| 2,134,744 | 11/1938 | Wales | 188/251 A X |
| 2,149,483 | 3/1979 | Whitelaw | 188/251 A X |
| 2,587,945 | 3/1952 | Wirth | 154/81 |
| 2,930,100 | 3/1960 | Rust, Jr. | 28/4 |
| 3,007,497 | 11/1961 | Shobert | 138/125 |
| 3,090,101 | 5/1963 | Chagnon/Kelleher | 28/72.2 |
| 3,257,259 | 6/1966 | Law | 28/107 X |
| 3,457,962 | 7/1969 | Shobert | 138/144 |
| 3,657,061 | 4/1972 | Carlson et al. | 161/81 |
| 3,772,115 | 11/1973 | Carlson et al. | 156/148 |
| 3,936,552 | 2/1976 | Krupp et al. | 188/251 A X |
| 3,994,762 | 11/1976 | Wrzeslen et al. | 156/178 |
| 4,018,482 | 4/1977 | Rastogi et al. | 301/6 E |
| 4,284,680 | 8/1981 | Awano et al. | 428/234 |
| 4,613,017 | 9/1986 | Bok | 188/71.7 |
| 4,621,662 | 11/1986 | Olry | 138/129 |
| 4,780,363 | 10/1988 | Evans et al. | 428/300 |
| 4,790,052 | 12/1988 | Olry | 28/110 |
| 4,955,123 | 9/1990 | Lawton et al. | 29/419.1 |
| 5,113,568 | 5/1992 | Lawton et al. | 29/419.1 |
| 5,184,387 | 2/1993 | Lawton et al. | 29/419.1 |
| 5,217,770 | 6/1993 | Morris, Jr. et al. | 428/36.3 |
| 5,312,660 | 5/1994 | Morris et al. | 428/36.3 |
| 5,323,523 | 6/1994 | Lawton et al. | 29/419.1 |
| 5,388,320 | 2/1995 | Smith et al. | 29/419.1 |

FOREIGN PATENT DOCUMENTS

| | | |
|---|---|---|
| 2911762 | 9/1980 | Denmark . |
| 0424988A1 | 1/1987 | European Pat. Off. . |
| 0232059A2 | 1/1987 | European Pat. Off. . |
| 0530741A1 | 10/1993 | European Pat. Off. . |
| 2626294 | 1/1988 | France . |
| 1006681 | 2/1956 | Germany . |

(List continued on next page.)

OTHER PUBLICATIONS

Structural Geometry of Braids, Atkins & Pearce, pp. 4–1 through pp. 4–14.

*Primary Examiner*—Ismael Izaguirre
*Attorney, Agent, or Firm*—David M. Ronyak

[57] ABSTRACT

Fibrous substrates for the production of carbon and/or ceramic (including mixtures of these) fiber reinforced carbon and/or ceramic (including mixtures of these) composites and to methods of manufacture of same. A multilayered annular shaped fibrous structure (10, 40) having a radius and a thickness, suitable for use in the manufacture of a friction disk, is made by forming a multidirectional fabric (30, 50) having filaments (12) or fibers extending in at least two directions; cutting arcuate or trapezoidal sectors (20, 20') of an annular shape from the multidirectional fabric, each sector having a radial width generally corresponding to the radial width of the fibrous structure (10, 40) to be formed; assembling the sectors in end to end or circumferentially overlapping contiguous relationship to form an annular layer having a radial width generally corresponding to the radial width of the fibrous structure to be formed; providing a stack of thus formed layers of fibrous material, one layer on top of another; and needlepunching the stacked layers to produce cross-linking of the layers by filaments displaced out of the layers and extending in a direction generally perpendicular to the faces of the layers. The multidirectional fabric is preferably a braided fabric (30) or a crosslapped fabric (50).

25 Claims, 5 Drawing Sheets

U.S. PATENT DOCUMENTS

| | | |
|---|---|---|
| 2012671 | 1/1979 | United Kingdom . |
| 2012671A | 1/1979 | United Kingdom . |
| 1549687 | 1/1979 | United Kingdom . |
| 2099365 | 8/1982 | United Kingdom . |
| 2230491 | 10/1990 | United Kingdom . |
| 2271155 | 4/1994 | United Kingdom . |
| 9101397 | 7/1991 | WIPO . |
| 9204492 | 9/1992 | WIPO . |

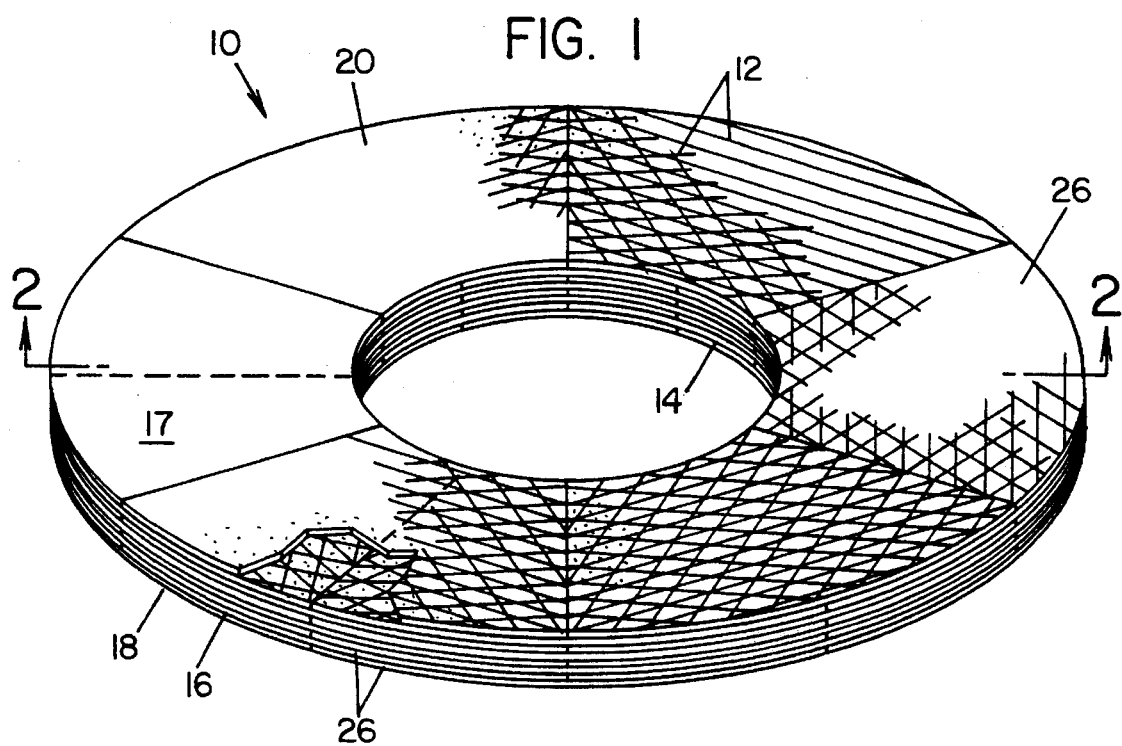
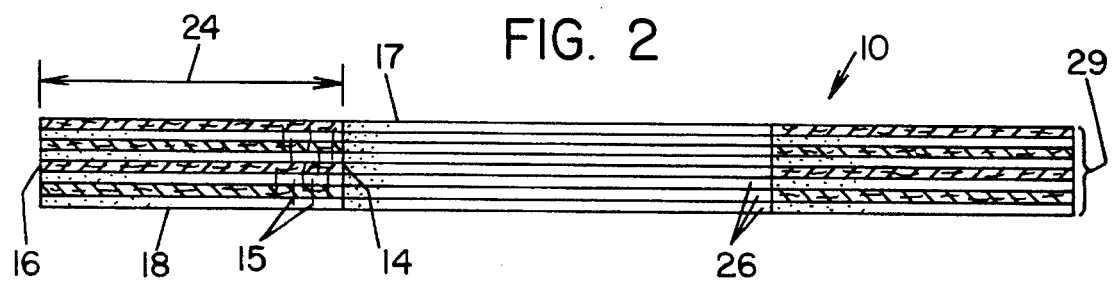
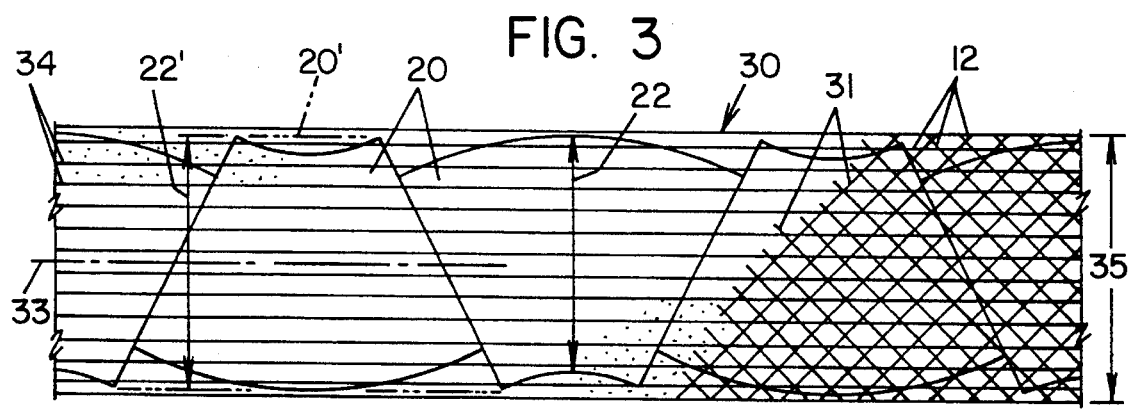

ANNULAR FILAMENTARY STRUCTURES AND METHODS OF MAKING

This invention relates to fibrous substrates for the production of carbon and/or ceramic (including mixtures of these) fiber reinforced carbon and/or ceramic (including mixtures of these) composites and to methods of manufacture of same. Exemplary of such a composite is a carbon fiber/carbon matrix brake disk made by depositing a carbon matrix on a carbon fiber substrate of the invention, the fibrous material of the substrate being carbonized to reinforce the carbon matrix with carbon fibers. Deposition of carbon on the substrate is effected by in situ cracking of a carbon bearing gas (hereinafter referred to as carbon vapor deposition, abbreviated "CVD" or carbon vapor infiltration, abbreviated "CVI", as these terms are used interchangeably for purposes of the present invention) or by repeatedly impregnating the substrate with a carbon bearing resin and thereafter charring such resin or a combination of such methods to densify the carbon matrix on the carbonized substrate. The invention is not directed to formation of the carbon matrix or densification of the carbon fiber substrate, but rather to the substrate, its preparation, and subsequent densification in known manner to provide a carbon fiber reinforced composite, especially one suitable for use as a friction disk in a brake or clutch.

A preferred material for use in the invention is polyacrylonitrile (PAN) fiber which, particularly if CVD is to be employed, is preferably in an oxidized condition which facilitates subsequent carbonization. Greige PAN fiber and carbon fiber or graphite fiber may also be found to be suitable. Oxidized PAN fiber (which may hereinafter be referred to as "OPF") is available commercially in various forms, including tows, yarns, woven and non-woven fabrics, knit fabrics and felts. For the present invention, a preferred starting form is OPF tow such as that available from RKT of Muir of Ord, Scotland. Tows and/or yarns of PAN fibers, carbon fibers, graphite fibers, ceramic fibers, precursors of carbon fibers and precursors of ceramic fibers, and mixtures of these may be used. As used herein the term "tow" is used to refer to a strand of continuous filaments. As used herein the term "yarn" is used to refer to a continuous strand of continuous or staple fibers or blends of these; thus the term "yarn" encompasses tow. Continuous fiber is generally preferred over discontinuous fiber due to enhanced mechanical properties in the resultant composite product.

In certain known processes (including those disclosed in U.S. Pat. No. 3,657,061 to Carlson et al., and U.S. Pat. No. 4,790,052 to Olry) for the manufacture of carbon fiber reinforced friction disks, such as brake disks employed on aircraft, annuli are cut out of parallel-sided multi-layered sheets of PAN fiber material to form one or more substrate annuli. This procedure results in considerable wastage of expensive PAN or OPF sheet and the offcut material cannot be reprocessed to continuous filament form to make a new continuous filament sheet.

According to Lawton et al. U.S. Pat. Nos. 4,955,123; 5,081,754; 5,113,568; 5,184,387 and 5,323,523, the amount of offcut waste generated in the production of preforms to be used in production of disks for aircraft braking systems is reduced by preparation of a shaped filamentary structure in the following manner: needlepunching a unidirectional layer of filaments to provide a degree of dimensional stability; cutting a plurality of segments from the unidirectional layer of needlepunched material; assembling a plurality of such segments in side-by-side contiguous relationship to produce a filamentary layer of the required structural shape; superposing at least one similar layer on the first layer; and needlepunching the superposed layers to assemble and join the segments. According to Lawton et al., wastage of the fibrous material is reduced because it is possible to lay out the segmental shapes to enable maximum use of filamentary material. This Lawton et al. process has several drawbacks. The needlepunched unidirectional "fabric" layer of filaments and the segments cut therefrom are difficult to handle due to poor lateral dimensional stability of the unidirectional layer of filaments. The arcuate segments cut from the unidirectional layer of filaments must have differing filament to chord angles to provide adequate properties to the annular preform and the resultant friction disk. Considerable offcut waste material is generated because the segments must be cut from the sheet having various chord orientations relative to the direction of the filaments. Arcuate segments having differing filament to chord angles must be assembled so as to provide both radially disposed and chordally disposed filaments relative to the annulus to be formed. This lattermost requirement presents a logistics problem.

According to U.S. Pat. No. 3,730,320 to Freeder et al., segmented strips of resin impregnated carbon or graphite cloth are assembled in partially overlapping relationship with opposite ends at opposite faces of the disk. The disk is formed and cured under high temperature and pressure to bond the segmented strips together. The cured disk is then pyrolyzed to produce a carbon or graphite char bond matrix.

According to another known method, arcuate sectors of resin impregnated carbon or graphite cloth are assembled in stacked annular layers with the radial joints formed by the abutted ends of the sectors of each layer being offset circumferentially relative to those of adjacent layers.

It is an object of certain embodiments of the present invention to minimize off-cut fibrous material when forming fibrous preforms to be used in the manufacture of friction disks.

It is a further object of certain embodiments of the invention to provide a near net shape annular friction disk preform.

According to an aspect of the invention there is provided a method of making a multi-layered annular shaped fibrous structure (10, 40) having a radius and a thickness comprising the steps of: forming a multidirectional fabric (30, 50) having substantially continuous fibrous members (12) disposed in at least two directions; cutting arcuate or trapezoidal sectors (20, 20') of an annular shape from said multidirectional fabric, each sector having a radial width (22, 22') generally corresponding to the radial width (24) of the fibrous structure to be formed; assembling the sectors (20, 20') in contiguous relationship to form an annular layer (26) having a radial width (22) generally corresponding to the radial width (24) of the fibrous structure to be formed; providing a stack (29) of thus formed layers of fibrous material, one layer on top of another; and needlepunching the stacked layers (26) to produce cross-linking of the layers by fibers (15) displaced out of the layers (26) and disposed in a direction generally perpendicular to the faces (17, 18) of the layers (26).

According to another aspect of the invention there is provided a shaped filamentary structure (10, 40) made according to the method described immediately above.

It is believed that suitable friction disk preforms can be made from various fibrous tapes formed by joinder of arcuate or trapezoidal shaped sectors cut from a multidirectional fabric such as braided, knit, woven and non-woven fabrics, the sectors being needlepunched as they are stacked or coiled layer upon layer.

The above and other features and advantages of the invention will become more apparent when considered in light of the following description of preferred embodiments of the invention in conjunction with the accompanying drawings which also form a part of the specification.

BRIEF DESCRIPTION OF THE DRAWING

FIG. 1 is an isometric view of a friction disk according to an embodiment of the invention.

FIG. 2 is an enlarged sectional view taken along plane 2—2 of FIG. 1, depicting schematically the fiber distribution therein.

FIG. 3 is a schematic depiction showing layout of arcuate sectors to be cut out of a strip or tape of a multidirectional fabric.

DETAILED DESCRIPTION OF PREFERRED EMBODIMENTS

Figure 4:
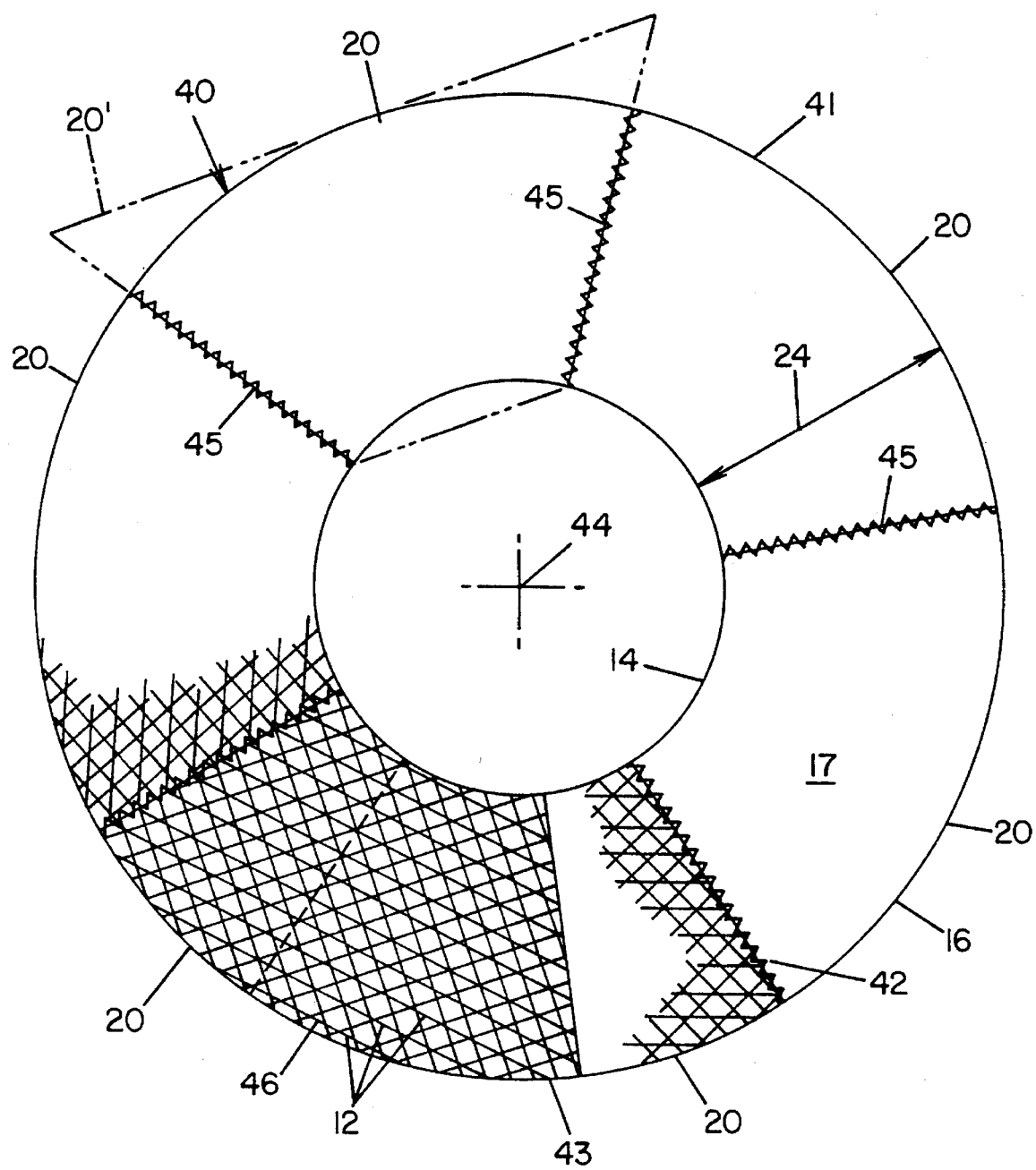
FIG. 4 is a plan schematic view of an embodiment of an annular shaped filamentary structure according to the invention formed from a helical tape formed of joined arcuate sectors of a multidirectional fabric.

Referring to the drawings, wherein like reference numerals designate like or corresponding parts throughout the several views, there is shown in FIGS. 1 and 2, a friction disk 10 comprising a stack 29 superposed annular layers 26 formed by joinder of substantially identical arcuate sectors 20 of multidirectional fabric derived from tows 12 of OPF cross-linked to one another by filaments 15 (FIG. 2) displaced from layers 26 by needlepunching to consolidate and densify a preform disk similar to preform disk 40 shown in FIG. 4, the OPF having been converted to carbon fiber and further densified after needlepunching by carbon matrix deposition using conventional CVI processes. In other embodiments, the cross-linked layers may have deposited thereon a matrix of carbon, ceramic, precursor of carbon, precursor of ceramic, and mixtures of these to further bind together the cross-linked layers. Each annular layer 26 in the embodiment shown in FIGS. 1 and 2 is formed of six substantially identical arcuate sectors 20 positioned side by side.

The filaments of tows 12 within the disk 10 may be substantially continuous within each respective arcuate sector 20 between the inside diameter (ID) and outside diameter (OD) cylindrical peripheral surfaces 14, 16 of the disk 10 and its flat, parallel wear faces 17, 18 except those filaments 15 that have been displaced perpendicularly to the wear faces 17, 18 by needlepunching to join the sectors. Continuous fiber (i.e. filament) is generally preferred over discontinuous fiber due to higher mechanical properties in the resultant composite friction disk product.

Figure 5:
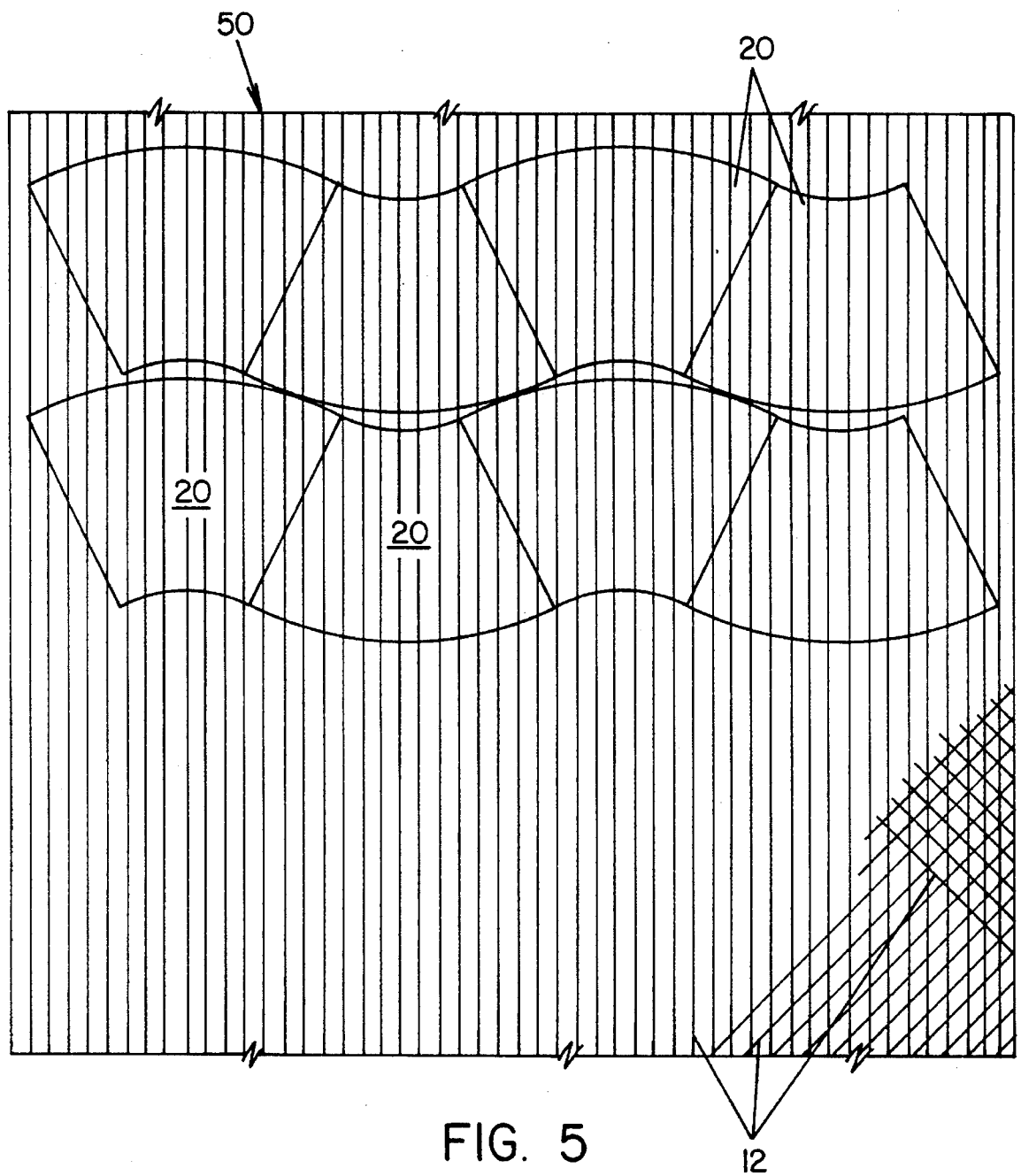
FIG. 5 is a plan view depicting a layout of arcuate sectors to be cut out from a large strip of of a a multidirectional fabric.

The sectors 20, 20' may be cut from a narrow strip such as strip 30 as shown in FIG. 3 or a wide sheet such as sheet 50 as shown in FIG. 5 and joined end to end or in overlapping manner to form a fibrous layer 26 of the required structural shape which may be joined to another fibrous layer by needlepunching of the stacked layers to form a fibrous preform such as an annular preform disk. Alternatively, the sectors 20, 20' may be joined end to end or in overlapping manner to form a helical fibrous tape (FIGS. 4, 6, 7, 8) or an annular layer (FIGS. 1, 2). The helical tape may be arranged to form a flat, hollow annular preform disk having a plurality of fibrous layers such as preform 40 as shown in FIG. 4. Sectors 20, 20' or a helical tape 41 formed from sectors 20, 20' may be interleaved with an additional helical fibrous tape, formed for example, by collapsing a helical hollow tubular braid as described in U.S. Pat. No. 5,217,770 to Morris and Liew, which is herein incorporated by reference. As shown in ghost lines in FIG. 6, a helical flat braid tape 61 may be interleaved with helical turns 62 formed of sectors 20 joined end to end or in overlapping manner. The braided helical tape 61 itself may be formed from one or more of side by side parallel braids which may be partially overlapped.

The fiber volume, i.e., the quantity of fiber per unit volume, which is usually expressed as a percentage with zero percent meaning that no fiber is present and one hundred percent meaning that only fiber is present, is essentially the same throughout each sector and thus any preform or disk formed exclusively from such sectors. In contrast, in preforms and disks formed from needlepunched stacked layers of curved braided filamentary material formed by bending a straight braid, the fiber volume is greater adjacent the inner periphery 14 of disk 10 and adjacent the outer periphery 16 of disk 10, than in the remainder of the disk 10. This variation in fiber volume is a natural result of forming an otherwise uniform straight tubular braid into a flattened annulus or helix. This naturally occurring variation in fiber volume associated with a curved braid formed by bending a straight braid can be minimized by braiding techniques described in U.S. Pat. No. 5,217,770 to Morris and Liew.

Having reference to FIG. 3, the sectors 20 having a radial width 22 are cut out from a straight braid 30 having a width 35. Because braid 30 is a multidirectional fabric, as contrasted with a unidirectional fabric as described in the aforementioned patents to Lawton et al., the relative orientation of adjacent sectors is not critical. The ends of adjacent sectors 20 may be contiguous as they are laid out and cut from braid such as braid 30 shown in FIG. 3 or tridirectional crosslapped fabric 50 shown in FIG. 5. As shown, very little offcut waste is generated compared to known methods, including that shown and described in the above mentioned patents to Lawton et al. Adjacent sectors 20 may be laid out 180 degrees relative to one another. It is also possible to merely cut the multidirectional fabric strip into trapezoidal shaped sectors 20' having a radial width 22', which may be trimmed after assembly into an annular preform or even after carbonization or densification of the preform. The braid 30 in the preferred embodiment shown in FIG. 3 is obtained by collapsing or flattening a straight tubular braid. In addition to the braiding members 31 which extend in helical paths relative to the lengthwise direction of the braid 30, a system of longitudinal members 34 extending in the lengthwise direction of the braid is introduced into the braid as it is formed. These longitudinal members 34 may be referred to as "unidirectionals". These unidirectionals 34 improve the dimensional stability as well as the tensile strength, compressive strength and moduli, and fiber volume of the tri-directional fabric. Unidirectionals 34 are introduced from stationary guide eyes in the braiding machine such that the unidirectionals will lie straight (without crimp) parallel to the braid axis 33 (longitudinal direction of the braid) while the helical braid members 31 introduced by the braiding machine carriers pass over and under the unidirectionals as the braided fabric 30 is formed. Straight braid 30 inherently has greater lateral stability than the unidirectional "fabric" of Lawton et al. Straight braid 30 may be needlepunched prior to cutting sectors 20 therefrom to provide even greater dimensional stability of the braid itself and the sectors to be cut therefrom.

Forming some of the braid members and/or unidirectionals of different materials than are used for the remainder of the members forming the braid may benefit final mechanical or other properties, e.g. vibration damping, of the needlepunched and densified structure. Such materials could include other carbon-based and/or ceramic-based fibers. The braiding members and/or unidirectionals may be formed of staple fibers.

In the embodiment shown in FIG. 4, the preform disk 40 comprises one or more helical turns 43 symmetrical about axis 44 of a fibrous tape 41 previously formed of arcuate sectors 20 joined end to end, e.g. by sewing with thread 42. The radial width of the tape 41 generally corresponds to the radial distance 24 between the inner periphery 14 and the outer periphery 16 of the flat annulus. The included angle of each sector 20 is such that the radial joints 45 of adjacent layers each formed of otherwise identical sectors are not aligned, e.g. sixty-seven degrees. The helical turns 43 of tape 41 are needlepunched to join them together. When finished, preform disk 40 is similar in appearance to that of friction disk 10 illustrated in FIG. 1. One or more additional helically wound tapes (not shown in FIG. 4) of similar or dissimilar construction, e.g. of continuous helical braid, may be interleaved with fibrous tape 41 to form a flat, hollow annular structure having a plurality of interleaved filamentary layers. The layers are joined by needlepunching which displaces filaments perpendicularly relative to the faces of the layers to cross-link the layers into an assembly. The longitudinal axis 46 of one of the groups of the filaments 12 in each sector 20 is disposed chordally relative to the arc of each respective sector and tangentially relative to the annular shaped structure 40. Also shown in FIG. 4 in ghost lines is trapezoidal sector 20' which may be trimmed to the arcuate shape of sector 20 after manufacture of tape 41 or preform disk 40.

Having reference to FIG. 5, a sheet or strip of multidirectional fabric such as crosslapped fabric 50 is shown. Fabric 50 is formed in known manner by needling together unidirectional webs of side by side filaments which webs are superposed such that the filaments of any unidirectional web forming the fabric cross at an angle to the filaments of any other unidirectional web forming the fabric. In the preferred embodiment illustrated, the fabric 50 consists of three layers of unidirectional webs and the angle of crossing of the filaments of any web is about sixty degrees relative to any other web forming the fabric 50. It is also possible to produce a suitable fabric using crossing layers, one of which is of parallelised staple fibers from a carding machine. Such carded layer may be formed from offcut waste fiber.

Figure 6:
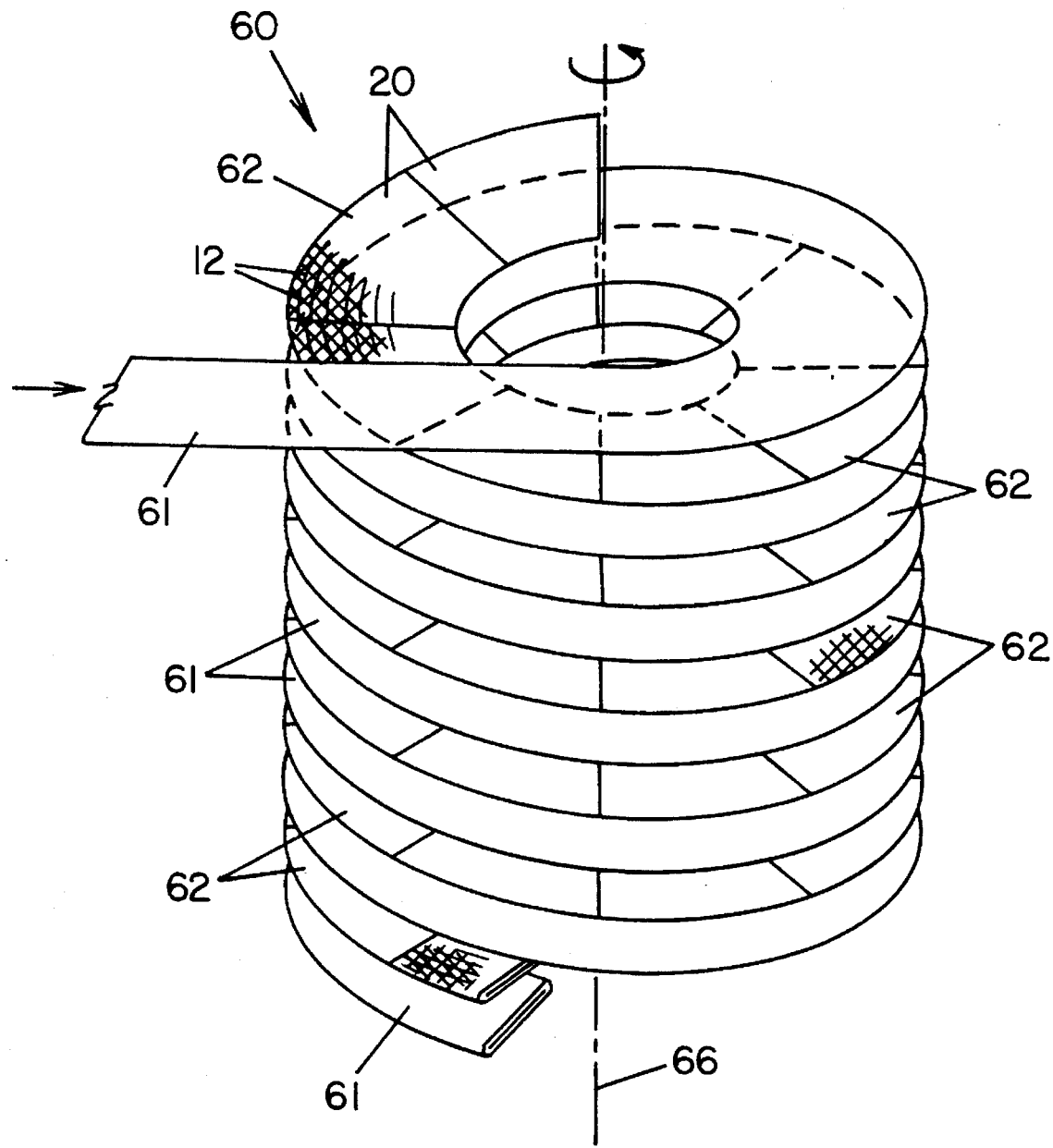
FIG. 6 is an exploded schematic view of an embodiment of an annular shaped filamentary structure according to the invention formed from a pair of helical tapes.

As shown in FIG. 6, a preform 60 having an axis of symmetry 66 is made from two helically wound tapes 61, 62 of dissimilar construction. Turns 61 of a tape of continuous helical braid, may be interleaved with turns 62 of fibrous tape formed from sectors 20 to form a flat, hollow annular structure having a plurality of interleaved filamentary layers. The tape layers are joined by needlepunching which displaces filaments perpendicularly relative to the faces of the layers to cross-link the layers into an assembly.

Fibrous tape 41, as shown in FIG. 4, is made by sewing together with thread 42 the radial joints 45 of the abutting circumferentially spaced ends of the adjacent sectors 20 prior to needlepunching of the stacked layers. This enables handling of a plurality of end to end abutted arcuate sectors 20 as a single helical tape portion 41 which can be guided into a rotary needlepunch loom such as that described in DE 2911762 to Dilo or WO 93/15250 to Lawton and Smith. Even when an apparatus such as that described in WO 93/15250 to Lawton and Smith is employed, presewing of the abutted sectors prevents separation of the abutting ends during needlepunching.

Figure 7:
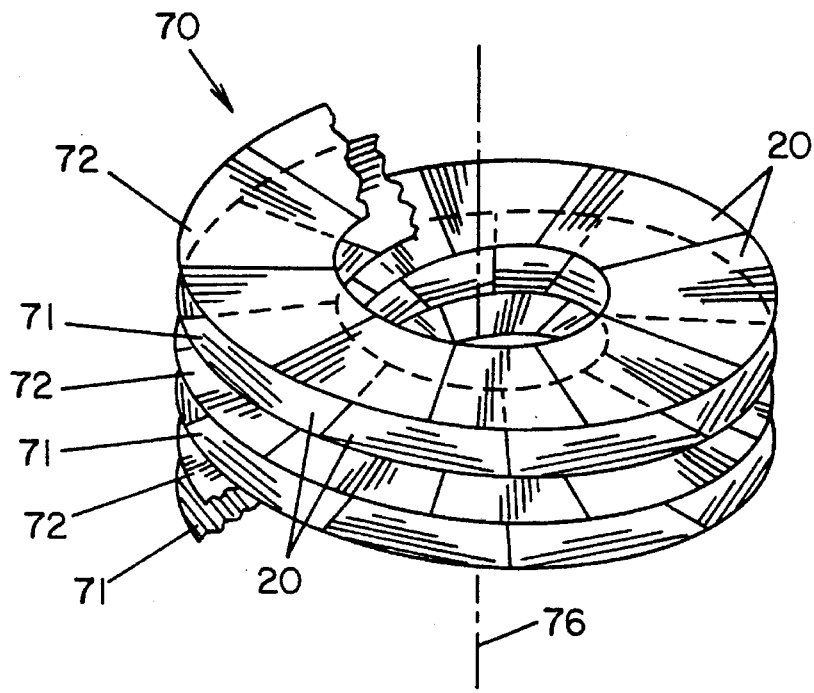
FIG. 7 is an exploded schematic view of a helical tape formed of two layers of sectors that are needled together.

Alternatively, as shown in FIG. 7, a helical tape such as tape 70 can be formed by arranging symmetrically about an axis of symmetry 76 sectors 20 of fibrous material into a first or lower layer 71 of end to end abutted sectors and superposing thereon a second or upper layer 72 of end to end abutted sectors with the ends of the sectors of each layer being staggered or offset in the lengthwise direction of the tape relative to those of the other layer, and needlepunching to join the two layers 71, 72 by filaments displaced out of the layers and extending in a direction generally perpendicular to the faces of the layers. As shown, two layers 71, 72 of sectors 20, each formed of a needlepunched unidirectional layer of filaments, with the sectors of the second layer 72 selected and arranged so that the filaments in the second layer are oriented differently relative to the chordal direction of the respective sector than those in the first layer 71, e.g. a first layer with chordally arranged filaments and second layer with radially arranged filaments, may be joined into a helical tape 70 by needlepunching. A preform may be made by needlepunching stacked turns or layers of tape 70.

Figure 8:
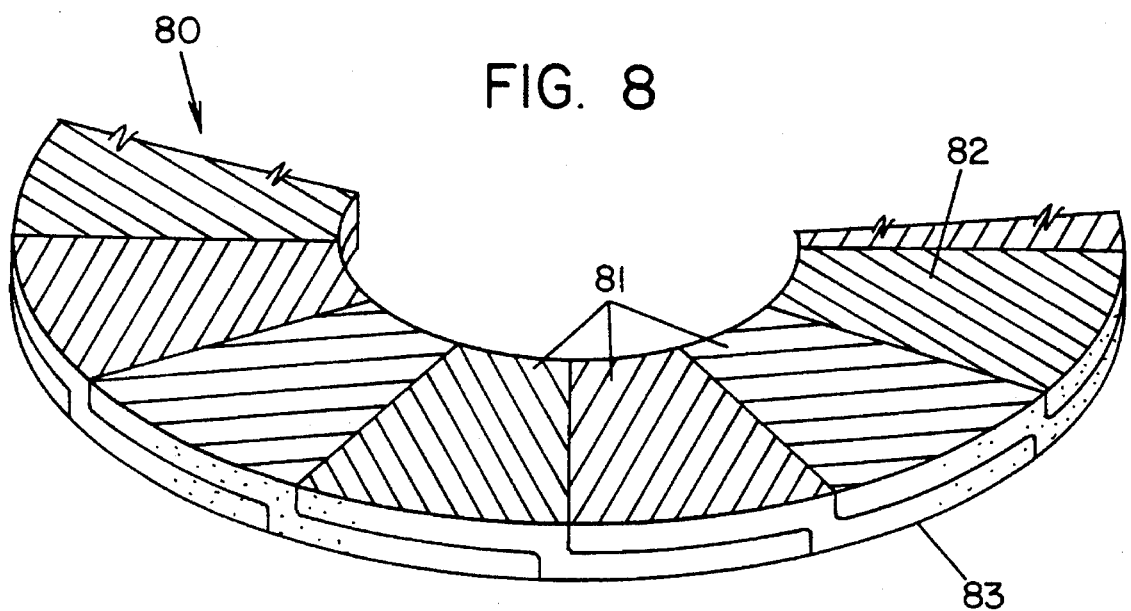
FIG. 8 is a schematic view of a helical tape formed of circumferentially overlapped sectors that are needlepunched together.

Alternatively, as shown in FIG. 8, a helical tape such as tape 80 can be formed by arranging sectors 81 of fibrous material in partially overlapping relationship with opposite ends at opposite faces 82, 83 of the tape and needlepunching to join the sectors 81. In this embodiment, as illustrated, it is also feasible to utilize sectors formed of a needlepunched unidirectional layer of filaments, with the sequentially adjacent sectors selected and arranged so that the filaments in the sequentially adjacent sectors are oriented differently relative to the chordal direction of the respective sequentially adjacent sectors. A preform may be made by needlepunching stacked turns or layers of tape 80.

A suitable straight braid such as braid 30 of FIG. 3 may be formed from a plurality of tows 12, e.g. 12 k OPF tow, on a conventional tubular braiding machine (not illustrated). A simplified version of a conventional Maypole-type braiding machine and its operation are illustrated in U.S. Pat. No. 3,007,497 to Shobert. An eminently suitable braiding machine having one hundred forty-four carriers and seventy-two unidirectional positions is available from W. STEEGER GmbH & Co. of Wuppertal, Germany.

One manner of expressing the character of a braid is in terms of picks/inch (PPI). For a straight collapsed tubular braid formed of 12 k tows of OPF and having a nominal width of seven inches when flattened, the braid has from about 2.5 to 5 ppi. PPI is a complex function of braider speed, fibrous material pull out rate, angle of pull out and width of braid, and is empirically determined. Five PPI means that five crossovers of the members being braided occur per inch of machine direction movement. PPI is conveniently determinable manually as the braid apparatus is empirically adjusted.

As previously stated, an optional, additional curved braid such as curved braid 61 shown in FIG. 6 may be interleaved with layers formed of sectors. A curved braid may be more accurately formed by a machine rather than manually as was previously done as described in US Pat. No. 5,217,770 to Morris et al. The machinery and manufacture of curved flattened tubular braid is described in U.S. Ser. No. 08/149,854 filed Nov. 10, 1993 entitled CURVED BRAID APPARATUS, naming Edward L. Morris, Jr. et al. as applicants, which application is herein incorporated by reference.

One or more layers of fibrous sectors 20 are joined to one another and/or to one or more other fibrous layers superposed thereon by needlepunching. Preferably, the arcuate sectors 20 are needlepunched into a unitary preform structure as they are fed continuously onto a rotating support. This may be accomplished using a rotary needlepunch loom such as that described in DE 2911762 to Dilo. This Dilo machine is provided with a needling head whose effective width corresponds to the radial extent of the fibrous strip or the arcuate sectors and preform being assembled. The apparatus described in the aforementioned patents to Lawton et al. may be employed; however the rotary receptacle need not have both inner and outer cylindrical walls to guide a continuous helical tape formed of sectors joined end to end; an inner or an outer cylindrical wall alone will suffice. The needling head of the apparatus shown in DE 2911762 to Dilo may be controlled programmed to avoid overneedling of the preform being made, which may occur at the inner periphery of the preform when using an apparatus such as that described in the aforementioned patents to Lawton et al.

If no rotary loom is available, joinder of one or more layers of fibrous sectors 20 may be accomplished by arranging the fibrous sectors into one or more superposed layers in a needle penetrable mold or jig and passing the jig and layers to be assembled to and fro through a conventional needlepunch loom. This technique is more fully described in the aforementioned patents to Lawton et al. and in U.S. Pat. No. 5,217,770 to Morris and Liew. The use of such a jig is less desirable than use of a rotary needlepunch loom because the fibrous arcuate sectors can not be fed continuously onto the jig as it is passed to and fro through a conventional reciprocal needlepunch loom such as that illustrated in U.S. Pat. No. 4,790,052 to Olry.

The resulting needlepunched structure may be thereafter subjected to CVD densification in conventional manner to produce a friction disk similar in appearance to disk 10 shown in FIG. 1 having an average or bulk density of about 1.8 g/cc. As used herein "density" is determined by weighing a specimen of known dimensions, such as that obtained by machining from the region of interest of a larger specimen, and is expressed as weight per unit volume, e.g., g/cc.

A plurality of such densified disks made according to the invention may be machined in conventional manner and assembled to form a multidisk brake similar to that shown and described in any of U.S. Pat. Nos. 4,018,482; 4,878,563; and 4,613,017.

Recycled or virgin OPF staple may be used in the manufacture of yarns to be formed into the fabric or fabrics to be used in manufacture of shaped filamentary structures of the invention.

It is preferred that the tows be of PAN fiber in its oxidized state (OPF) when subjected to all textile processes described herein. While it may be possible to produce suitable preform disks out of greige PAN fiber and thereafter oxidize such preforms in a batch method as opposed to the continuous oxidation method employed in the manufacture of oxidized PAN fiber, this is not deemed most economical, particularly because prior to oxidation the PAN fiber does not have the desired high density nor is it able to withstand the high temperature of the furnace cycles desired to be employed subsequent to formation of the preform disk.

While the invention has been described with reference to the use of tow, it is within the invention to use yarn formed of continuous filaments or staple fibers or blends of these in place of tow for any of the braiding members and any of the unidirectionals.

What is claimed is:

1. A method of making a multi-layered annular shaped fibrous structure (10, 40) having a radius and a thickness comprising the steps of: forming a multidirectional fabric (30, 50) having substantially continuous fibrous members (12) disposed in at least two directions; cutting arcuate or trapezoidal sectors (20, 20') of an annular shape from said multidirectional fabric, each sector having a radial width (22, 22') generally corresponding to the radial width (24) of the fibrous structure to be formed; assembling the sectors (20, 20') in contiguous relationship to form an annular layer (26) having a radial width (22, 22') generally corresponding to the radial width (24) of the fibrous structure to be formed; providing a stack (29) of thus formed layers (26) of fibrous material, one layer on top of another; and needlepunching the stacked layers (26) to produce cross-linking of the layers (26) by fibers (15) displaced out of the layers (26) and disposed in a direction generally perpendicular to the layers (26).

2. The method of claim 1, wherein the multidirectional fabric (30, 50) has groups of fibrous members (12) disposed in three directions generally parallel to the plane defined by the fabric.

3. The method of claim 2, in which one of the groups of the fibrous members (12) in each sector is disposed tangentially relative to the annular shaped structure (10, 40).

4. The method of claim 2, in which one of the groups of the fibrous members in each sector (20) is disposed chordally relative to the arc of that sector.

5. The method of claim 1, in which each of the sectors (20) is substantially identical.

6. The method of claim 1, in which the ends of the sectors (20) forming an annular layer (26) are offset circumferentially relative to the ends of the sectors forming an immediately adjacent layer (26).

7. The method of claim 1, further comprising forming said sectors (20, 20') by cutting from a braided fabric (30).

8. The method of claim 7, further comprising providing a flattened straight tubular braid (30) having unidirectionals (34), the braid having a width (35) generally corresponding to the radial width (22, 22') of the sectors (20, 20') to be formed.

9. A flat annular fibrous structure (10, 40, 60, 70, 80) made according to claim 7.

10. The method of claim 1, further comprising forming a helical tape (41) by joining end to end sectors (20, 20') cut from one of braided (30) and crosslapped needlepunched fabrics (50) and needling stacked turns (43) of the tape.

11. The method of claim 10, wherein the sectors (20, 20') forming the tape (41) are joined end to end by sewing (42).

12. The method of claim 1, further comprising forming the multidirectional fabric in the shape of a helical tape (70) by joining a first layer (71) of end to end abutted sectors (20) cut from fibrous material selected from the group consisting of a needlepunched layer of unidirectional filaments, braided fabrics and crosslapped needlepunched fabrics with a second layer (72) of end to end abutted sectors (20) cut from fibrous material selected from the group consisting of a needlepunched layer of unidirectional filaments, braided fabrics and crosslapped needlepunched fabrics, by needlepunching the first and second layers (71, 72) forming the tape (70) and needling stacked turns of the tape.

13. The method of claim 12, wherein the tape (70) is formed by needling together two coextensive layers (71, 72) each formed from sectors (20), the joints formed by the abutted ends of the first layer (71) being staggered relative to the joints formed by the abutted ends of the sectors of the second layer (72) forming the tape.

14. A flat annular fibrous structure (10, 40, 60, 70 80) made according to claim 12.

15. The method of claim 1, further comprising forming the multidirectional fabric in the shape of a helical tape (80) by arranging sectors (81) cut from fibrous material selected from the group consisting of a needlepunched layer of unidirectional filaments, braided fabrics and crosslapped needlepunched fabrics in partially overlapping relationship with opposite ends of each sector (81) at opposite faces (82, 83) of the tape (80) and needlepunching the arranged sectors (81) forming the tape (80) and needlepunching stacked turns of the tape (80).

16. The method of claim 1, further comprising forming the sectors (20, 20') by cutting from a crosslapped needlepunched fabric (50) that is formed by needling together unidirectional webs of side by side filaments Which webs are superposed such that the filaments of any unidirectional web forming the fabric cross at an angle to any other unidirectional web forming the fabric.

17. The method of claim 16, wherein the angle of crossing of the filaments of any web is about 60 degrees relative to any other web forming the crosslapped needlepunched fabric.

18. The method of claim 1, further comprising the steps of stacking at least one layer (62) formed of arcuate sectors (20) formed from multidirectional fabric with an additional fibrous layer (61).

19. The method of claim 18, wherein said additional fibrous layer (61) is formed of braided tape.

20. The method of claim 1 further comprising forming a flat hollow annulus (40) by helically winding a fibrous tape (41) formed of arcuate or trapezoidal sectors (20, 20') assembled end to end, the radial width (45) of the tape generally corresponding to the radial distance (24) between the inner periphery (14) and the outer periphery (16) of the flat annulus.

21. The method of claim 1, wherein the sectors are formed from the group consisting of PAN fibers including OPF, carbon fibers, graphite fibers, ceramic fibers, precursors of carbon fibers and precursors of ceramic fibers, and mixtures of these.

22. The method of claim 1, further including binding together the cross-linked layers by a matrix selected from the group consisting of carbon, ceramic, precursor of carbon, precursor of ceramic, and mixtures of these.

23. A flat annular fibrous structure (10, 40, 60, 70, 80) made according to the method of claim 1.

24. A method of producing an annular filamentary structure (10) having an inside diameter periphery (14) and an outside diameter periphery (16) comprising the steps of: forming a straight braided filamentary tape (30) of a width (35) generally corresponding to the radial distance (24) between the inside diameter periphery (14) and the outside diameter periphery (16) of the annular structure (10) to be formed; cutting arcuate sectors (20) of an annulus from said tape (30); assembling the sectors (20) end to end to produce an annular layer (26); superposing at least one fibrous layer (61) on said annular layer (26) formed from said sectors (20); and needlepunching the superposed layers to produce cross-linking of the layers (26, 61) by fibers (15) displaced out of the layers (26, 61) and which extend in a direction generally perpendicular to the layers.

25. A flat annular fibrous structure (10, 40, 60, 70, 80) made according to claim 24.

* * * * *